Patented Jan. 19, 1932

1,842,163

UNITED STATES PATENT OFFICE

ERNEST F. GRETHER, OF MIDLAND, MICHIGAN, ASSIGNOR TO THE DOW CHEMICAL COMPANY

DIARYL ETHER DERIVATIVE

No Drawing. Application filed October 7, 1929. Serial No. 398,094.

This invention relates to the discovery of certain new diarylether derivatives, viz., nitro derivatives of diarylether sulfonic acids in which one, or both, of the aryl groups consists of a naphthyl group, and more particularly to such derivatives of phenyl-alphanaphthyl ether, and to methods of making such derivatives.

It is well known that naphthyl-alkyl ethers split off the alkyl group when treated with sulphuric acid. I have shown, however, in a previous application, Serial No. 289,081, filed June 28, 1928, of which the present is a division, that diaryl ethers containing a naphthyl group, or groups, are much more stable and can be transformed into their sulphonic acids without decomposition by the action of concentrated sulphuric acid. The resulting sulphonic acids are distinguished from the corresponding ethers, and other derivatives of such ethers, as chloro-, bromo-, nitro- and other substituted derivatives, in that they are soluble in aqueous media. They therefore lend themselves more readily to further treatment by the ordinary methods of nitration, halogenation, et cetera, than do the ethers, or the other derivatives thereof just mentioned. I have now found that such sulphonic acids may be nitrated to form the corresponding nitro derivatives which are new and useful intermediate compounds for the manufacture of dyes and other organic chemicals.

To the accomplishment of the foregoing and related ends, the invention, then, consists of the steps and products hereinafter fully described and particularly pointed out in the claims, the following description setting forth but several of the various ways in which the principle of the invention may be employed.

The abovementioned nitro compounds can be readily prepared by directly treating the reaction mixture resulting from the sulphonation step, with nitric acid. With one equivalent of nitric acid, the mono-nitro naphthyl-aryl ether sulfonic acids are formed, while poly-nitro derivatives are obtained if an excess of nitric acid is used. These nitro derivatives and their salts are soluble in water, forming clear yellow solutions. In most cases the salts can be crystallized out by concentrating their solutions.

The hereinmentioned nitro compounds and their salts dye wool in bright, clear yellow shades, which upon further treatment with copper salts are transformed into greenish shades.

Upon reduction, the corresponding amino compounds are obtained from the aforesaid nitro compounds, which amino compounds are useful intermediates for making dyes and other products.

By way of illustration, I will describe in detail the steps for making mono-nitro phenyl-alphanaphthyl ether sulfonic acid, but it is understood that the invention is not limited thereto.

I take 50 parts of phenyl-alphanaphthyl ether which may be conveniently obtained by reaction between potassium phenate and alpho-chloronaphthalene in the presence of a copper catlyst (Ullmann's reaction), and mix with 250 parts of concentrated sulphuric acid. The reaction mixture becomes yellow, and by stirring or shaking, the ether passes partly into solution, giving off some heat. On continued heating to about 80° C. for approximately one-half hour, the remainder of the ether is dissolved, and a clear, slightly colored solution of the mono-sulphonic acid is formed, which crystallizes on cooling and standing, filling the whole reaction mixture with white crystals. To this mixture are slowly added 26 parts of nitric acid, (specific gravity 1.4) with stirring and cooling to maintain the temperature below about 30° C. The reaction product is dissolved in water and sulphuric acid, neutralized, and precipitated with lime. The resulting calcium salt is treated with sodium sulphate to form a solution of the sodium salt of 1-phenoxy-mono-nitro-naphthalene sulfonic acid. The deep yellow colored solution is filtered and evaporated to obtain the solid sodium salt.

It is difficult to determine precisely the orientation of the substituent nitro and sulpho groups respectively, in this compound, ·but I believe its constitution is represented substantially by the graphic formula:—

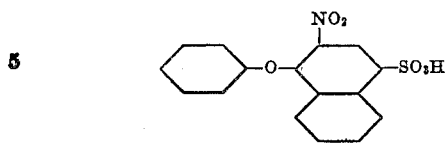

The identity of this compound is clearly established by the method of its preparation as herein described.

An alternative procedure would be to isolate the sodium salt of the mono-sulphonic acid first formed as above, and then liberate the free acid which is thereupon nitrated at a temperature not exceeding 20° to 30° C. Nitrating at higher temperatures produces poly-nitro derivatives which have an orange color and dye wool in orange shades.

In similar manner the mono-nitro derivative of alpha-beta-dinaphthyl ether sulfonic acid made from alpha-chloro-naphthalene and beta-naphthol, or its salt may be obtained by starting with the unsulfonated ether, and likewise the sulphonic acids and nitro derivatives of related sulfonated diaryl ethers, in which one or both of the aryl groups is represented by a naphthyl group.

It is obviously possible to obtain such product, e. g. mono-nitro phenyl-alphanaphthyl ether sulfonic acid, by nitrating the ether first, and then sulphonating the nitro compound. This method is less convenient, however, owing to the insolubility of the ether or the nitro compounds in aqueous media. In following this procedure it is necessary, for a good yield, to dissolve the ether in a solvent such as glacial acetic acid and then nitrate at a temperature below about 25° C., to obtain the mono-nitro derivative, which may thereupon be sulphonated to form the sulphonic acid of the mono-nitro compound. The latter procedure is much more costly, and for that reason the first described method is to be preferred. The mono-nitro derivative, obtained as above, crystallizes from glacial acetic acid in yellow crystals, having a melting point of 93 to 94° C.

Other modes of applying the principle of my invention may be employed instead of the one explained, change being made as regards the details herein disclosed, provided the steps or products stated by any of the following claims, or the equivalent of such, be employed.

I therefore particularly point out and distinctly claim as my invention:—

1. The method of making a diaryl ether derivative, comprising reacting a naphthyl-aryl ether and sulfuric acid, and then reacting upon the sulfonic acid obtained thereby, with nitric acid.

2. The method of making a diaryl ether derivative, comprising reacting an alpha-naphthyl-aryl ether and sulfuric acid, and then reacting upon the sulfonic acid obtained thereby, with nitric acid.

3. The method of making a diaryl ether derivative, comprising reacting alphanaphthyl-phenyl ether and sulfuric acid, and then reacting upon the sulfonic acid obtained thereby, with nitric acid.

4. The method of making a diaryl ether derivative, comprising reacting a naphthyl-aryl ether and sulfuric acid at a temperature below 100° C., and then reacting upon the product of such first step, with nitric acid.

5. The method of making a diaryl ether derivative, comprising reacting an alpha-naphthyl-aryl ether and sulfuric acid at a temperature below 100° C., and then reacting upon the product of such first step, with nitric acid.

6. The method of making a diaryl ether derivative, comprising reacting alpha-naphthyl-phenyl ether and sulfuric acid at a temperature below 100° C., and then reacting upon the product of such first step, with nitric acid.

7. The method of making a diaryl ether derivative, comprising reacting a naphthyl-aryl ether and sulfuric acid at a temperature of about 80° C., and then reacting upon the product of such first step, with nitric acid at a temperature of about 20 to 30° C.

8. The method of making a diaryl ether derivative, comprising reacting a naphthyl-aryl ether sulfonic acid and nitric acid.

9. The method of making a diaryl ether derivative, comprising reacting an alpha-naphthyl-aryl ether sulfonic acid and nitric acid.

10. The method of making a diaryl ether derivative, comprising reacting alphanaphthyl-phenyl ether sulfonic acid and nitric acid.

11. The method of making a diaryl ether derivative, comprising reacting a naphthyl-aryl ether sulfonic acid and nitric acid at a temperature of about 20 to 30° C.

12. The method of making a diaryl ether derivative, comprising reacting an alpha-naphthyl-aryl ether sulfonic acid and nitric acid at a temperature of about 20 to 30° C.

13. The method of making a diaryl ether derivative, comprising reacting alphanaphthyl-phenyl ether sulfonic acid and nitric acid at a temperature of about 20 to 30° C.

14. As a new product, a nitro diarylether sulfonic acid characterized by being soluble in water to form clear yellow solutions, and dyeing wool bright yellow shades which are transformed to greenish shades on treatment with copper salts.

15. As a new product, a mono-nitro naphthyl-aryl ether sulfonic acid characterized by crytsallizing from glacial acetic acid in yellow crystals having a melting point of 93 to 94° C.

16. As a new product, a compound, preparable by reacting a naphthyl-aryl ether sulfonic acid and nitric acid at a temperature below substantially 30° C., in which the sulfonic and nitro groups are probably attached to the naphthalene residue.

17. As a new product, a compound, preparable by reacting an alphanaphthyl-aryl ether sulfonic acid and nitric acid at a temperature below substantially 30° C., in which the sulfonic and nitro groups are probably attached to the naphthalene residue.

18. As a new product, a compound, preparable by reacting alphanaphthyl-phenyl ether sulfonic acid and nitric acid at a temperature below substantially 30° C., and having the probable formula,

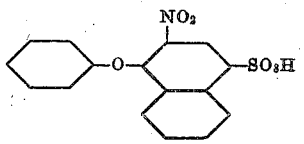

19. As a new product, a compound preparable by sulfonating a naphthyl-aryl ether at a temperature below 100° C., and then reacting upon the so obtained sulfonic acid with nitric acid, at least the sulfonic acid group being attached to the naphthalene nucleus.

20. As a new product, a polynitro-naphthyl-aryl ether sulfonic acid preparable by sulfonating a naphthyl-aryl ether at a temperature below 100° C., and then reacting upon the so obtained sulfonic acid with nitric acid at a temperature above substantially 30° C.

21. As a new product, a polynitro-naphthyl-phenyl ether sulfonic acid preparable by sulfonating a naphthyl-phenyl ether at a temperature below 100° C., and then reacting upon the so obtained sulfonic acid with nitric acid at a temperature above substantially 30° C.

22. The method of making a polynitro-naphthyl-aryl ether sulfonic acid which comprises reacting a naphthyl-aryl ether with sulfuric acid at a temperature below 100° C., and then reacting upon the product of the first step, with nitric acid at a temperature above substantially 30° C.

23. The method of making a polynitro-naphthyl-phenyl ether sulfonic acid which comprises reacting a naphthyl-phenyl ether with sulfuric acid at a temperature below 100° C., and then reacting upon the product of the first step, with nitric acid at a temperature above substantially 30° C.

Signed by me, this 21st day of September, 1929.

ERNEST F. GRETHER.